(12) United States Patent
Guillemette

(10) Patent No.: US 6,945,764 B2
(45) Date of Patent: *Sep. 20, 2005

(54) METHOD AND APPARATUS FOR DISTRIBUTING MATERIAL IN A PROFILE EXTRUSION DIE

(76) Inventor: A. Roger Guillemette, 10 Pike St., West Warwick, RI (US) 02893

( * ) Notice: Subject to any disclaimer, the term of this patent is extended or adjusted under 35 U.S.C. 154(b) by 386 days.

This patent is subject to a terminal disclaimer.

(21) Appl. No.: 09/997,100

(22) Filed: Nov. 29, 2001

(65) Prior Publication Data

US 2002/0117772 A1 Aug. 29, 2002

Related U.S. Application Data

(63) Continuation-in-part of application No. 09/546,487, filed on Apr. 10, 2000, now Pat. No. 6,533,656.

(51) Int. Cl.[7] .............................................. B29C 47/12
(52) U.S. Cl. .................... 425/113; 425/131.1; 425/461; 425/465
(58) Field of Search ........................... 425/131.1, 382.4, 425/380, 113, 461, 465, 466, 464; 264/167; 29/705, 284

(56) References Cited

U.S. PATENT DOCUMENTS

| | | | | |
|---|---|---|---|---|
| 4,187,068 A | * | 2/1980 | Vassar | 425/381 |
| 4,405,547 A | * | 9/1983 | Koch et al. | 264/173.16 |
| 4,846,658 A | * | 7/1989 | McMullen | 425/197 |
| 4,960,375 A | * | 10/1990 | Saito et al. | 425/131.1 |
| 5,197,514 A | * | 3/1993 | Jaun | 137/597 |
| 5,219,588 A | * | 6/1993 | England et al. | 425/189 |
| 5,500,173 A | * | 3/1996 | Dugan | 264/75 |
| 5,702,659 A | * | 12/1997 | Kragle et al. | 264/177.11 |
| 6,533,565 B1 | * | 3/2003 | Guillemette | 425/113 |

* cited by examiner

*Primary Examiner*—Mark Eashoo
(74) *Attorney, Agent, or Firm*—Perman & Green, LLP

(57) ABSTRACT

A method and apparatus for extruding plastic products having large cross sections, which require a correspondingly large die cross section, is described in which the cross section of the die is divided into regions of predetermined flow and separate flow streams are supplied to each region in proportion to the relative size of the flow region to the overall die cross section.

17 Claims, 6 Drawing Sheets

US 6,945,764 B2

METHOD AND APPARATUS FOR DISTRIBUTING MATERIAL IN A PROFILE EXTRUSION DIE

RELATED APPLICATION

This application is a continuation-in-part application of application Ser. No. 09/546,487, filed Apr. 10, 2000, now U.S. Pat. No. 6,533,565, issued Mar. 13, 2003 and claims the priority thereof for common subject matter.

BACKGROUND OF THE INVENTION

In the field of extruding complex shapes one of the more challenging items to produce is the flexible gaskets used for sealing refrigerators, automobile doors, hatches, and the like. These products utilize a complex cross section which requires considerable dexterity for the die to accurately reproduce the product. In order to accurately extrude these shapes, the die must completely fill while maintaining a continuous flow of plastic. The dies used in this type of process are generally referred to as profile dies. In manufacturing such dies it is often necessary to construct the die, use the die to see how it works and then, through a series of corrections, gradually bring the die into tolerance. This trial and error method is time consuming and expensive.

Profile dies are also used for extruding large plastic parts, for example fence posts and rails. In this instance, it is not a problem of intricate areas to fill, it is more a problem of providing a large volume of flow which is uniformly distributed over a large die outlet.

It is a purpose of this invention to construct a profile die which provides a balanced flow to the extremities of the die passage and to provide a more accurate and simpler way to construct a profile die within closer tolerances. A die with close tolerances will allow the product to be extruded with less material with a resulting savings in cost.

Another purpose of this invention is to distribute a large volume of molten plastic uniformly across a large die outlet while maintaining a reasonable flow rate so as to avoid dead spots which may result in scorching or buildup of plastic within the die.

SUMMARY OF THE INVENTION

A profile die system is constructed for extruding a flexible product having a complex cross section. The die system of this invention consists of an assembly of axially aligned generally cylindrical modules. A series of passages are provided to deliver molten plastic from the input to the die in a balanced flow. To accomplish this a distribution module is constructed with an inlet to receive plastic from an extruder. The distribution module has a plurality of distribution channels extending downstream in the die system. The distribution channels are sized and positioned to supply selected regions of the extrusion passage. The distribution channels exit at the downstream face of the distribution module. A transition module is positioned downstream of the distribution module and is constructed with a series of transition passages extending from its upstream to its downstream face. In the assembled position, the inlets of the transition passages are aligned with the exits of the distribution channels to receive molten plastic therefrom. The cross section of the transition passages gradually converts a generally cylindrical flow to a cross sectional shape representative of the region of the die selected for the particular passage.

In another embodiment, the distribution modules take a primary role and provide a series of stepped volume expansions in which each module increases the number of channels in a predetermined manner. The volume of the required die output is calculated and divided into a series of volume steps. This is accomplished by separating the overall die area into smaller regions for receiving flowing plastic from an outlet of a distribution passage. The number of appropriate regions depends on the flow rates, pressures, and other parameters required to completely extrude the product to tolerance.

It will be necessary where large products are being extruded to have several steps in which the number of supply channels are multiplied to achieve the supply to each of the selected regions. Each step would involve a module that would multiply the number of supply channels. Depending on the complexity of the product shape it may be possible to feed the die extrusion channel directly from the downstream distribution module without the need for interim shape transition modules as indicated above.

In constructing the distribution channels, it is first necessary to analyze the shape of the extrusion passage and divide its cross sectional area into regions for concentration of plastic according to the nuances of its shape. The number of distribution channels is determined by the number of regions selected. The cross sectional area of each of the distribution channels is designed to be less than the cross section of the profile die system inlet and consistent with the flow area of the region serviced by the channel. In this manner the overall flow volume from the extruder is metered proportionally into the selected regions. Each of the transition passages are constructed to have a reduced cross sectional area from that of the distribution channel with which it communicates. Therefore, the flow volumes in each of the regional flow streams is gradually reduced from the inlet of the distribution module to the extrusion die, thereby creating an overall funnel effect in each of the regional streams. In the transition module the passage is constructed to convert the generally cylindrical flow to a shaped flow more compatible with the entrance to the die passage in each of the selected regions.

The selection of flow regions in the case of large area die outputs having simple shapes depends more on the size and flow characteristics of the material. The flow area of the die output is divided into sufficient regions to insure a uniform distribution of plastic throughout the die under a consistent pressure and flow rate.

In either embodiment it is important that the area of the die profile be divided into flow regions and that the distribution channels are configured to supply a balanced and uniform flow to each of the flow regions.

DESCRIPTION OF THE DRAWING

The preferred embodiment of the invention is described in more detail below with reference to the drawing in which:

FIG. 3e is a top sectional view of the extrusion die of FIG. 3a.

DETAILED DESCRIPTION OF THE INVENTION

Figure 1A:
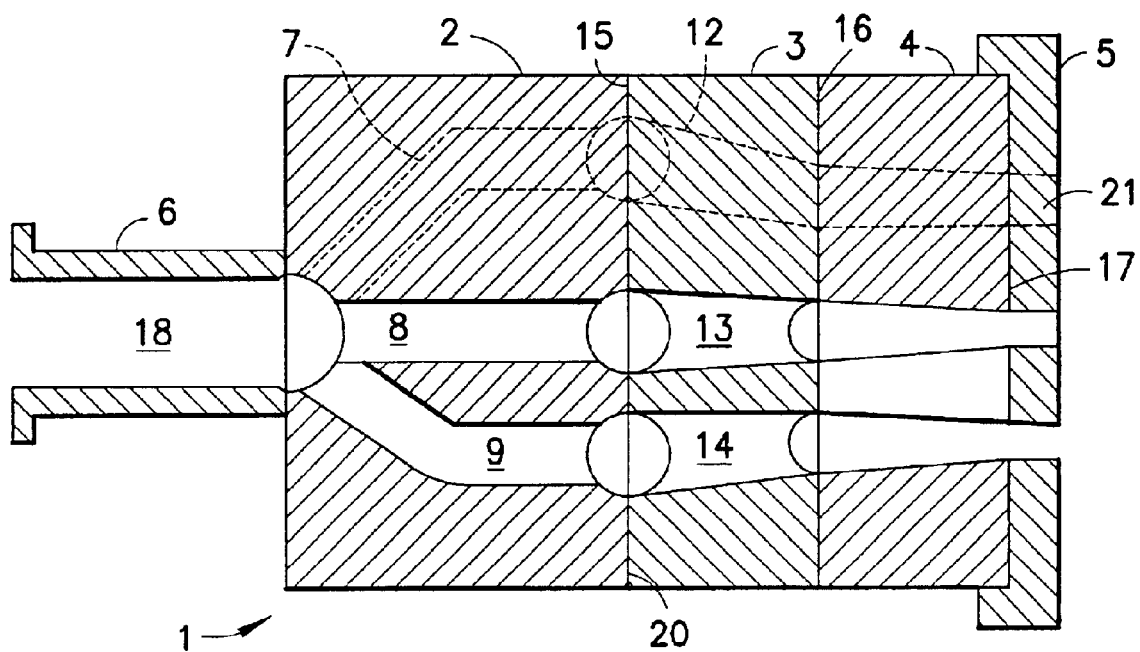
FIG. 1a is a cross sectional view of the profile die system of this invention.
Figure 1B:
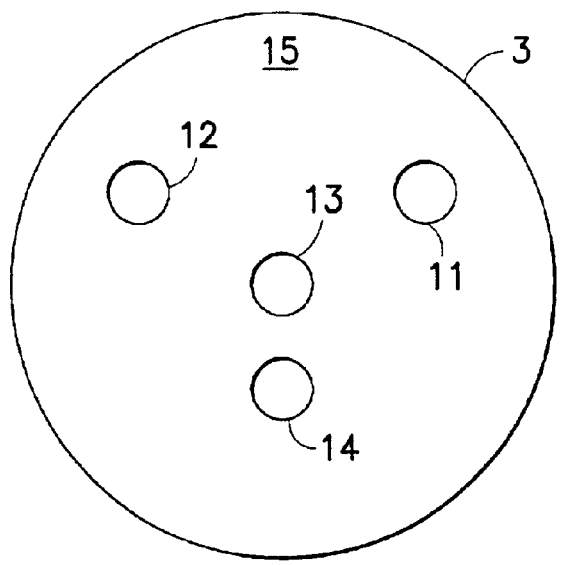
FIG. 1b is an end view of the upstream face of the transition module of this invention.
Figure 1C:
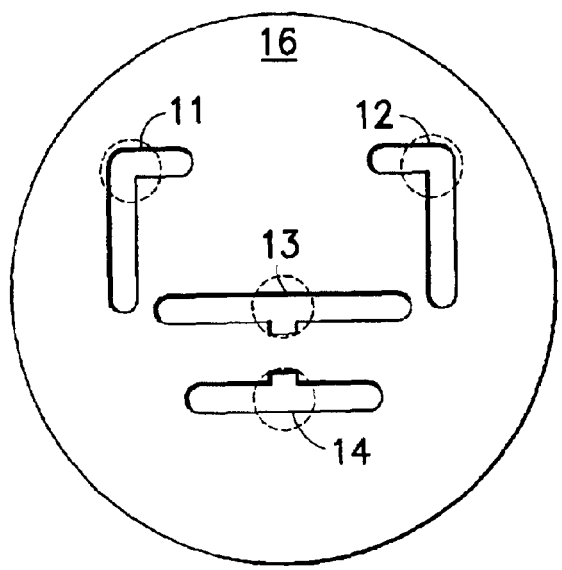
FIG. 1c is an end view of the downstream face of the transition module of this invention.
Figure 1D:
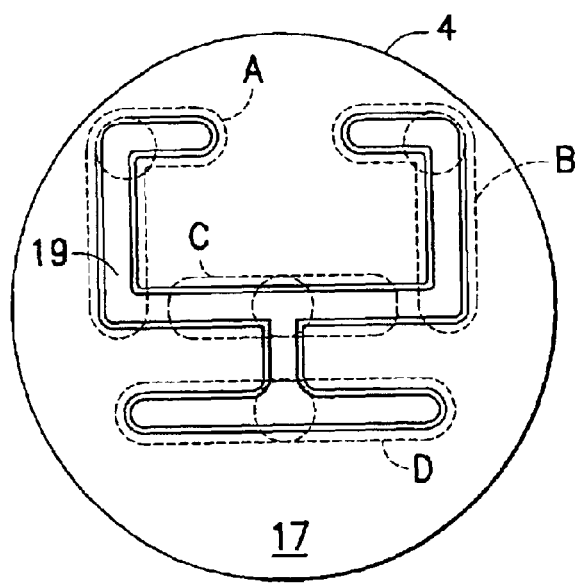
FIG. 1d is an end view of the upstream face of the die module of this invention.

As shown in FIG. 1a, a profile extrusion die system 1 is constructed having a distribution module 2, a transition module 3 and a die module 4. A die plate 5 retains the modules in the assembled condition and provides a straight exit 21 for the flowing plastic from the die module 4. Inlet flange 6 is shown integral with the distribution module 2 and encloses inlet 11 to the profile die system 1. The inlet flange 6 is constructed to connect to the extruder which supplies the plasticized material to the profile die system 1 for extrusion into a complex shape as illustrated in FIG. 1d.

A series of distribution channels 7, 8, 9, and 10 (not shown) are constructed by electric discharge machining or other means within the distribution module 2. The number and size of the distribution channels are selected relative to the complexity of the die. The cross sectional area of each of the distribution channels 7–10 is less than the cross sectional area of the inlet. In the example shown, four distribution channels are selected to meter the flowing plastic into four regional flow streams having volumes relative to regional portions of the extrusion passage 19. Each of the distribution channels exit at the downstream face 20 of the distribution module 2.

A transition module 3 is assembled adjacent to the downstream face 20 of the distribution module 2. Transition passages 11 through 14, as shown in FIG. 1b, are constructed by electric discharge machining or other means. The passages 11–14 extend from entrances in upstream face 15 (FIG. 1b) of the transition module 3 to exits in the downstream face 16 (FIG. 1c) in module 3. In the assembled position, the entrances of the transition passages 11–14 align with the exits of the distribution channels 7–10 respectively to receive flowing material.

Consistent with the overall flow strategy of the profile die system of this invention, the flow area of each of the transition passages is reduced relative to the flow area of each of the distribution channels to which it is connected. In addition the cross section of the transition passage changes over its length to convert the flow from generally cylindrical to a shaped flow consistent with the shape of the selected region of the die cross section. The exits of the passages 11–14 are shown in FIG. 1c.

To accomplish the balanced flow, the shape of the cross sectional shape of die passage 19 is analyzed and accordingly divided into a plurality of regions, for example; A, B, C, and D shown in FIG. 1d. Each region is selected to coincide with areas of possible distribution difficulties where complete filling of the die is critical. The filling of the die throughout its volume must be accomplished with constant velocity and flow. After the regions are selected, the percentage of flow volume for each region is calculated and related back to the size of the distribution channel which supplies the particular region.

For illustration purposes, the cross section of extrusion passage 19, may be divided into regions A, B, C, D as shown by dotted lines in FIG. 1d. In order to determine the proportional flow area of the channels 7–10, the ratio of the area of the region supplied by a channel, i.e. channel 7 supplies A, channel 8 supplies C, etc., to the overall area of the die profile is determined. The channel is sized to accommodate a flow stream consistent with the requirements of the related region.

To insure an overall uniform flow at a consistent velocity, the regional flow paths constructed by the assembly of distribution channels 7–10, transition passages 11–14, and extrusion passage 19 are designed for a funnel effect. This is accomplished by reducing the cross sectional areas of adjoining portions of the flow path from the upstream to the downstream ends of the regional flow paths. This assists in maintaining a constant velocity of the flow. The gradual increase in pressure which arises within the funnel shaped flow paths forces the molten material into the most remote section of the die.

The embodiment shown is for illustration purposes only, as the possible die shapes are infinitely variable. In each instance, depending on the cross section of the product, a specific flow path must be designed. In very complex dies it may be necessary to use multiple transition modules. Where necessary, bushings may be used to throttle the flow from the distribution module to the transition module as a means of adjusting flow to balance or correct for manufacturing inaccuracies.

In addition for special applications involving the extrusion of multiple materials, it may be necessary to provide separate inlets and distribution channels to individual regions. A particular region would be supplied separately and maintained as an independent channel from the inlet to its outlet in order to extrude a product having components of different materials. This could be accomplished in a common or independent distribution module. In some instances a transition module for one component could be used as the distribution module for another component. The extruded components would be joined and welded together in the final product. In this manner extruded assemblies having two or more components of different materials can be processed in the same profile die assembly.

Figure 2:
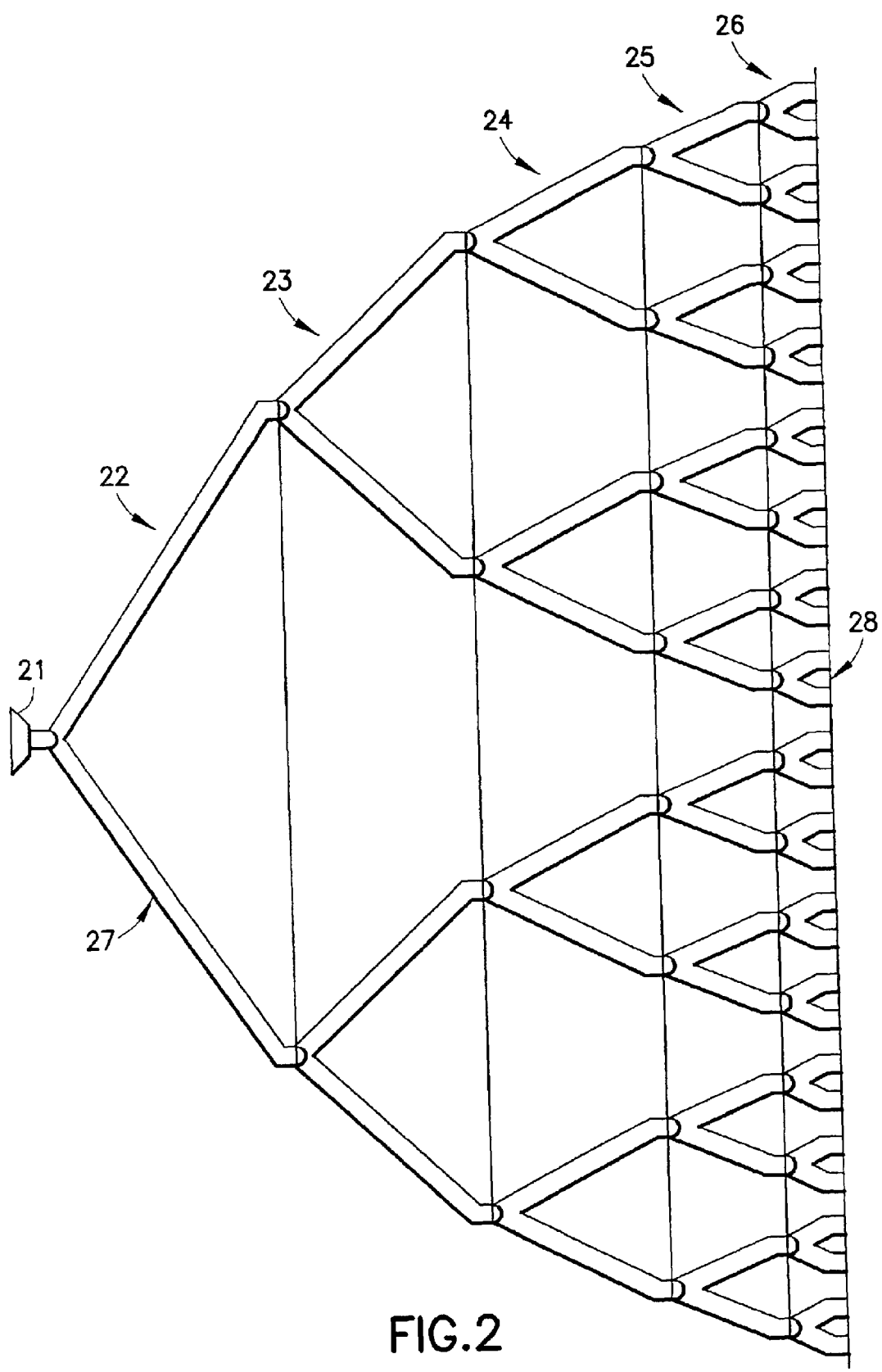
FIG. 2 is a schematic view of a distribution system for large die outputs.
Figure 3A:
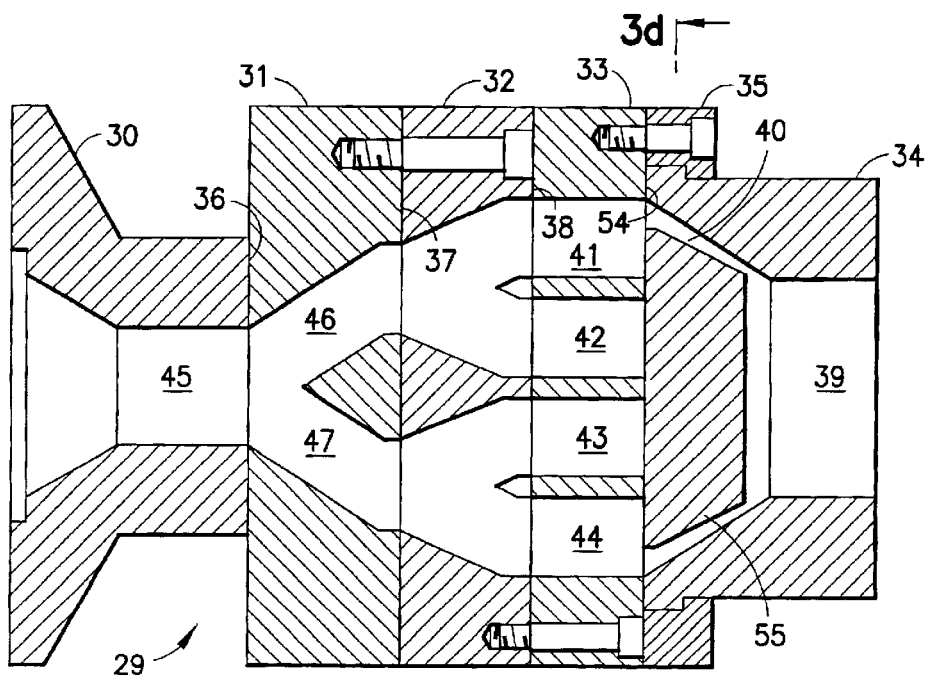
FIG. 3a is a side sectional view of an extrusion die having a two step volume expansion.
Figure 3B:
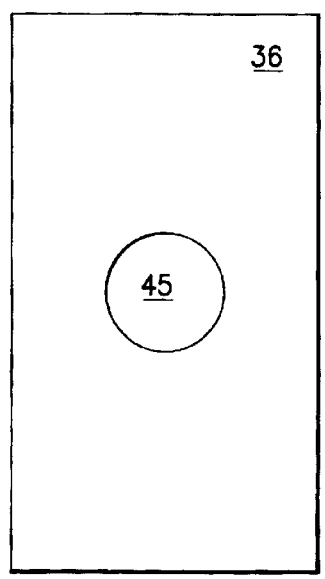
FIG. 3b is an upstream view of the interface surface of module 31.
Figure 3C:
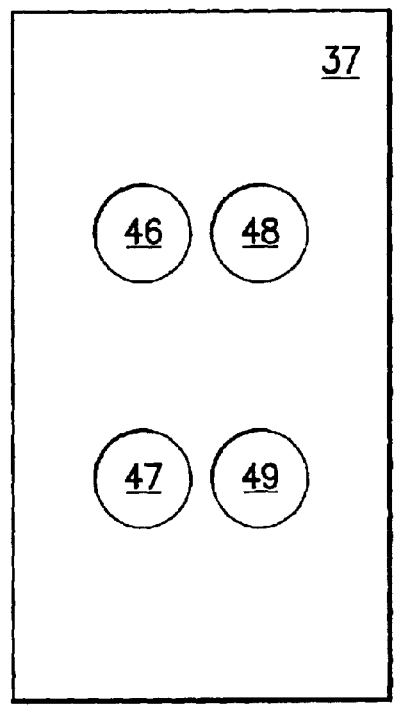
FIG. 3c is an upstream view of the interface surface of module 32.
Figure 3D:
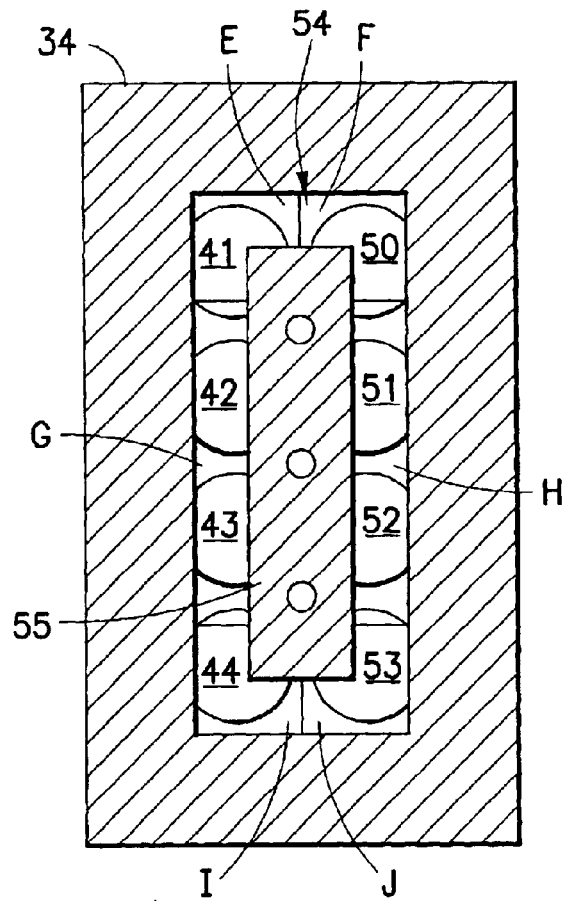
FIG. 3d is an upstream sectional view of the interface surface of module 33, taken along section line A—A.
Figure 3E:
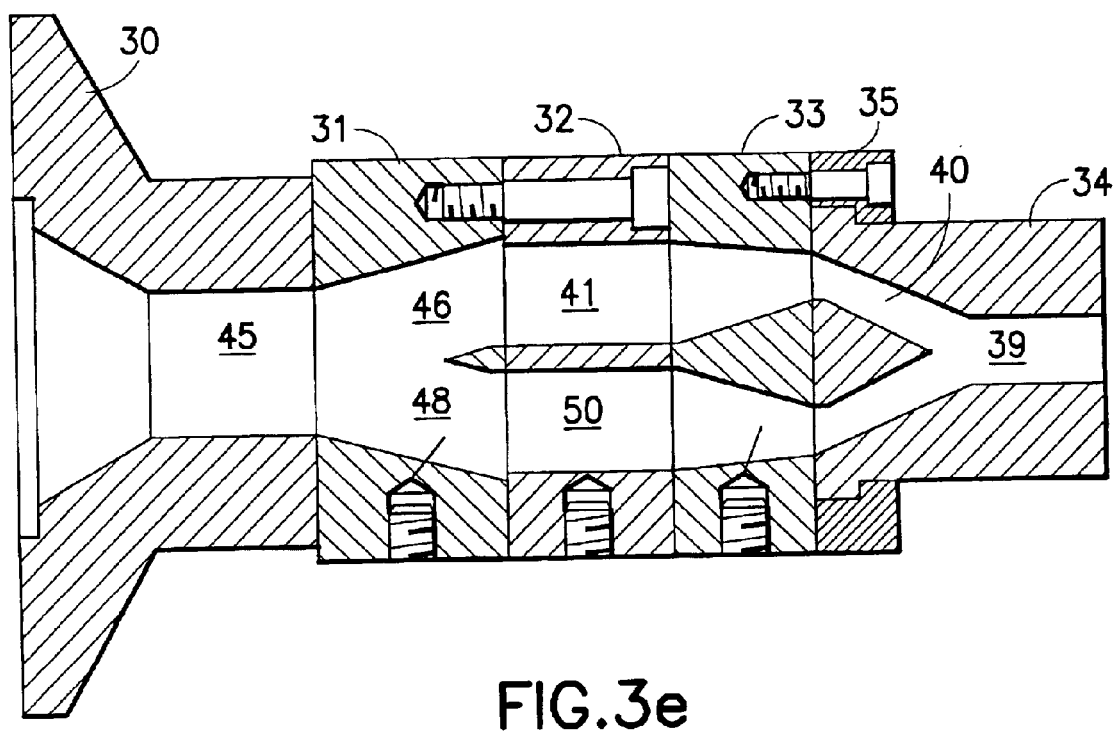

Another embodiment of this invention is shown in FIGS. 2–3e. In this instance the extruded product is of relatively simple cross section, but requires a large volume of flow, for example in the case of extruding plastic/wood composite fence posts. The posts can be designed as solid or hollow, as is shown in FIG. 3a.

The distribution system of this embodiment comprises a series of capillaries 27 arranged in a sequence of distribution modules 22–26. As shown in FIG. 2, the output area at die outlet 28 is divided into 32 regions for individual supply of plastic through capillaries 27. The flow area is doubled at each module to expand the area of the inlet 21 to accommodate the die output area at 28. This capillary network serves to act as a reservoir to restrain the plastic under pressure and control the flow of plastic at a speed that will provide a uniform flow at the output 28. Depending on the size of the die output area and the number of regions, it may be desirable to provide a gradual reduction in passage diameter at each module, namely to use the funnel effect, as described above. The configuration of capillaries may take on an infinite number of combinations depending on the size of the die output and the flow characteristics of the material being extruded. The passages of each module have inlets and outlets which are aligned in the assembled state with the adjacent upstream and downstream modules to receive and supply flowing plastic from the upstream inlet 21 to the downstream outlet 28.

FIGS. 3a–3e show a system in which the output flow area is divided into six flow regions E–J. Each region is supplied by supply passages as shown, for example: Region E is supplied by passage 41 and so on. The die system 29 consists of an inlet flange 30 having a supply passage 45. This passage receives molten plastic directly from an extruder (not shown). Distribution module 31 contains a pair of capillaries or passages 46 which are split, as shown in FIG. 3e into side by side passages 46, 48, and 47, 49. This results in multiplying the flow area approximately by a factor of 4. The outlets of these passages are shown in the upstream view of face 37 of module 31 and are aligned with the passages of adjacent downstream module 32. A second expansion step is provided by module 32 which expands the four passages of module 31 to eight passages at the outlet of module 32. The upstream face 38 of module 32 will have eight outlets. A transition module 33 is provided to direct the divided outputs to the selected regions E–J. The relative arrangement of, the paired outlets 41,50, 42,51, 43,52, and 44,53 relative to the selected flow regions E–J is shown in the end view of FIG. 3d. It can be seen that, all flow regions of the large area die outlet 39 of extrusion passage 40 are supplied by at least one distribution passage. Die 34 is assembled with the distributions modules 31 and 32, the transition module 33, and die 34 and is held in place by a suitable clamp 35.

In general with large dies, which extrude products having simple cross sectional profiles, the transition module 33 plays a minor role. The important part of the construction of this embodiment involves the dividing of the output into an appropriate number of regions to insure a uniform flow throughout the die 34. In either case it is an essential step to divide the area of the die outlet profile into individual flow regions and to provide a distribution system which will provide a balanced and uniform supply of flowing plastic to each of the flow regions.

I claim:

1. A die system for extruding plastic products, said plastic flowing through a passage constructed in a series of assembled modules and extending from an upstream inlet to a downstream outlet, said products being formed in accordance with the cross section of the outlet of the system, said die system comprising:
    at least one distribution module having a plurality of distribution channels constructed therein to form a portion of the die system passage, each of said distribution channels constructed to supply a portion of the plastic flow;
    a die module having an extrusion passage constructed therein to form a portion of the die system passage to receive flowing plastic from said distribution channels and to extrude said plastic through the outlet of said die system to form the extruded product; and
    wherein said die system outlet cross section is divided into preselected flow regions, said regions having non-uniform flow areas identified for their critical distribution requirements and at least some of which having irregular shape with different flow requirements; and
    wherein, at least one of said distribution channels provides plastic flow directly to one of said flow regions; and
    further wherein the flow volume provided by said at least one distribution channel is determined by the ratio of the cross sectional area of the preselected region supplied thereby, to the cross sectional area of the die system outlet.

2. A die system for extruding plastic products, said plastic flowing through a passage constructed in a series of assembled modules and extending from an upstream inlet to a downstream outlet, said products being formed in accordance with the cross section of the outlet of the system, according to claim 1, wherein said die system further comprises:
    at least one transition module having a plurality of transition channels constructed therein to form a portion of the die system passage, said transition channels communicating with said distribution channels to receive flowing plastic therefrom, said transition channels constructed to supply flowing plastic to one of said preselected flow regions of said die system outlet.

3. A die system for extruding plastic products, said plastic flowing through a passage constructed in a series of assembled modules and extending from an upstream inlet to a downstream outlet, said products being formed in accordance with the cross section of the outlet of the system, according to claim 1, wherein at least one of said distribution channels forms an independent regional flow stream, and wherein said regional flow stream is independently supplied with a different material for forming a component of the extruded plastic product.

4. A die system for extruding plastic products, said plastic flowing through a passage constructed in a series of assembled modules and extending from an upstream inlet to a downstream outlet, said products being formed in accordance with the cross section of the outlet of the system, according to claim 1, wherein each of said distribution channels is constructed having a smaller cross section than the immediately upstream portion of said die system passage to create a funnel effect from said inlet to said outlet within each of the regional flow streams formed thereby.

5. A die system for extruding plastic products, said plastic flowing through a passage constructed in a series of assembled modules and extending from upstream inlet to a downstream outlet, said products being formed in accordance with the cross section of the outlet of the system, as described in claim 1, further comprising multiple, axially assembled, distribution modules wherein the, number of distribution channels in adjacent downstream distribution modules is enlarged in predetermined steps to provide at least one distribution channel for each of said flow regions.

6. In an extrusion die system for extruding a plastic product, a passage for carrying flowing plastic, extending from an upstream inlet to a downstream outlet, said downstream outlet having a cross sectional profile which is divided into preselected regions, said regions having non-uniform flows areas identified for their critical distribution requirements and at least some of which having irregular shape with different flow requirements; said passage comprising:
    a series of distribution channels, each channel designed to supply a regional plastic flow according to the volume of plastic required in one of said preselected regions of said cross sectional profile, each of said distribution channels having an outlet shaped to conform to the region to which it supplies plastic flow; and
    an extrusion channel communicating with said distribution channels to receive flowing plastic therefrom, and designed to extrude the plastic into a product having said cross sectional profile.

7. In an extrusion die system for extruding a plastic product, a passage for carrying flowing plastic, extending from an upstream inlet to a downstream outlet, said downstream outlet having a cross sectional profile which is divided into preselected regions, said passage, according to claim 6, further comprising:

a series of transition channels communicating with said distribution channels, and designed to direct said regional plastic flow to one of said preselected regions.

8. In an extrusion die system for extruding a plastic product, a passage for carrying flowing plastic, extending from an upstream inlet to a downstream outlet, said downstream outlet having a cross sectional profile which is divided into preselected regions, said passage, as described in claim 6 wherein at least one of said regional flow streams is independently supplied with a different material for forming an individual component of the extruded plastic product.

9. In an extrusion die system for extruding a plastic product, a passage for carrying flowing plastic, extending from an upstream inlet to a downstream outlet, said downstream outlet having a cross sectional profile which is divided into preselected regions, said passage, according to claim 6, wherein each of the connected distribution channels is constructed having a smaller cross section than the immediately upstream portion of said passage to create a funnel effect within each of the regional flow streams formed thereby.

10. In an extrusion die system for extruding a plastic product, a passage for carrying flowing plastic, extending from an upstream inlet to a downstream outlet, said downstream outlet having a cross sectional profile which is divided into preselected regions, as described in claim 6 wherein said passage further comprises:

a plurality of axially assembled distribution modules, each of said modules having distribution channels constructed therein, wherein the number of distribution channels in adjacent downstream distribution modules is enlarged in predetermined steps to provide at least one distribution channel for each of said flow regions.

11. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system comprising the steps of:

analyzing said cross sectional profile to identify regions having predetermined flow requirements;

dividing the area of the cross sectional profile into said flow regions for the purpose of directing the supply of plastic;

calculating a ratio for each of said regional areas equal to the regional area divided by the total area of said cross sectional profile;

constructing at least one module for dividing the flow of plastic into multiple distribution channels for supplying a flow volume to a flow region in proportion to the ratio calculated for said region;

constructing a die module for forming the downstream outlet of the extrusion die system ; and interconnecting said modules to supply the plastic flow to the outlet in alignment with the flow regions.

12. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system, according to claim 11, further including the step of constructing a transition module having transition channels constructed therein for receiving the flow of plastic from the distribution channels and directing said plastic flow to said flow regions.

13. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system, according to claim 11, wherein at least one of said regional flow streams is independently supplied with a different material for forming a component of the extruded plastic product.

14. In an extrusion die system for extruding a plastic product, said system having a passage for supplying a flow of plastic extending from an upstream inlet to a downstream outlet, said downstream outlet having a cross sectional profile consistent with the cross section of the extruded product, a method of constructing an extrusion die system, as described in claim 11, wherein each of the distribution channels is constructed having a smaller cross section than the immediately upstream portion of said die system passage to create a funnel effect within each of the regional flow streams formed thereby.

15. An extrusion die having a passage for carrying plastic from an upstream inlet to a downstream outlet, to extrude plastic products in a specified profile comprising:

a plurality of identified flow regions which form part of the specified profile having predetermined plastic flow requirements;

a plurality of axial assembled distribution modules, each of said distribution modules having an array of distribution channels constructed therein, said array of channels expanding in number in predetermined steps from an upstream distribution module to an adjacent downstream distribution module, to provide at least one flow channel for supplying plastic to each of said identified flow regions, wherein each of said distribution channels in a distribution module is constructed having a smaller cross section than the distribution channel of an immediately upstream module to provide a funnel effect from said inlet to said outlet within each of said at least one regional flow streams formed thereby.

16. An extrusion die having a passage for carrying plastic from an upstream inlet to a downstream outlet, to extrude plastic products having a specified profile, according to claim 15, wherein the number of channels in an array doubles from an upstream module to its adjacent downstream module.

17. An extrusion die according to claim 15, wherein, said array of distribution channels is constructed to provide a reservoir for flowing plastic, thereby restraining said plastic flow at a predetermined rate to provide a uniform flow over the specified profile.

* * * * *